United States Patent
Swora et al.

(10) Patent No.: US 7,667,346 B2
(45) Date of Patent: Feb. 23, 2010

(54) AFFIXATION ADAPTER

(75) Inventors: Jürgen Swora, Lahntal (DE); Jörg Diehl, Rauschenberg (DE); Kai Jockel, Kirchhain (DE)

(73) Assignee: SW-Motech GmbH & Co., KG, Rauschenberg (DE)

( * ) Notice: Subject to any disclaimer, the term of this patent is extended or adjusted under 35 U.S.C. 154(b) by 442 days.

(21) Appl. No.: 11/698,868

(22) Filed: Jan. 29, 2007

(65) Prior Publication Data

US 2007/0176492 A1    Aug. 2, 2007

Related U.S. Application Data

(60) Provisional application No. 60/774,218, filed on Feb. 17, 2006.

(30) Foreign Application Priority Data

Jan. 30, 2006    (DE) .................. 20 2006 001 479 U

(51) Int. Cl.
  *B60K 15/00* (2006.01)
(52) U.S. Cl. .................................. 307/9.1
(58) Field of Classification Search ............ 307/9.1, 307/10.1; 180/208, 314, 225, 69.4
See application file for complete search history.

(56) References Cited

U.S. PATENT DOCUMENTS

| | | | | |
|---|---|---|---|---|
| 3,872,944 A | * | 3/1975 | Shapiro et al. ............. | 180/208 |
| 4,234,050 A | * | 11/1980 | Condon ..................... | 180/190 |
| 4,235,263 A | * | 11/1980 | Lake, Jr. ................... | 141/1 |
| 4,269,219 A | * | 5/1981 | Dybvig ...................... | 137/322 |
| 4,805,716 A | * | 2/1989 | Tsunoda et al. ............ | 180/219 |
| 2004/0031833 A1 | | 2/2004 | Alderman | |

FOREIGN PATENT DOCUMENTS

| | | |
|---|---|---|
| DE | 298 23 838 U1 | 12/1999 |
| DE | 200 20 651 U1 | 5/2001 |
| DE | 20 20047 014 057 U1 | 12/2004 |
| EP | 1 076 003 A1 | 2/2001 |
| JP | 02005112095 A * | 4/2005 |

* cited by examiner

*Primary Examiner*—Albert W Paladini
(74) *Attorney, Agent, or Firm*—Clark & Brody

(57) ABSTRACT

An adapter to detachably affix an implement comprises mutually engaging segments with cross-sectionally shaped structures. An upper segment for the base of a fuel tank bag is shaped similarly and in locking manner to a lower segment affixed to a fuel tank sealing lid. Both segments have frame-like shapes and are detachably assembled, one segment spanning the other from above or below in interlocking manner. The segments are fitted with aligned ends which can be assembled to one another with pairwise, diametrically opposite portions. The ends of the segment are hollow claws that partly enclose claw counterparts of the other segment. Ends of the upper segment are fitted with gripping ribs. A spring-loaded detent catch may snap using the ends into a borehole of a cog, thereby actuating a magnetic switch applying a low voltage to terminals. A cover mounted in vibration-damping manner may be fitted with an implement coupling.

26 Claims, 5 Drawing Sheets

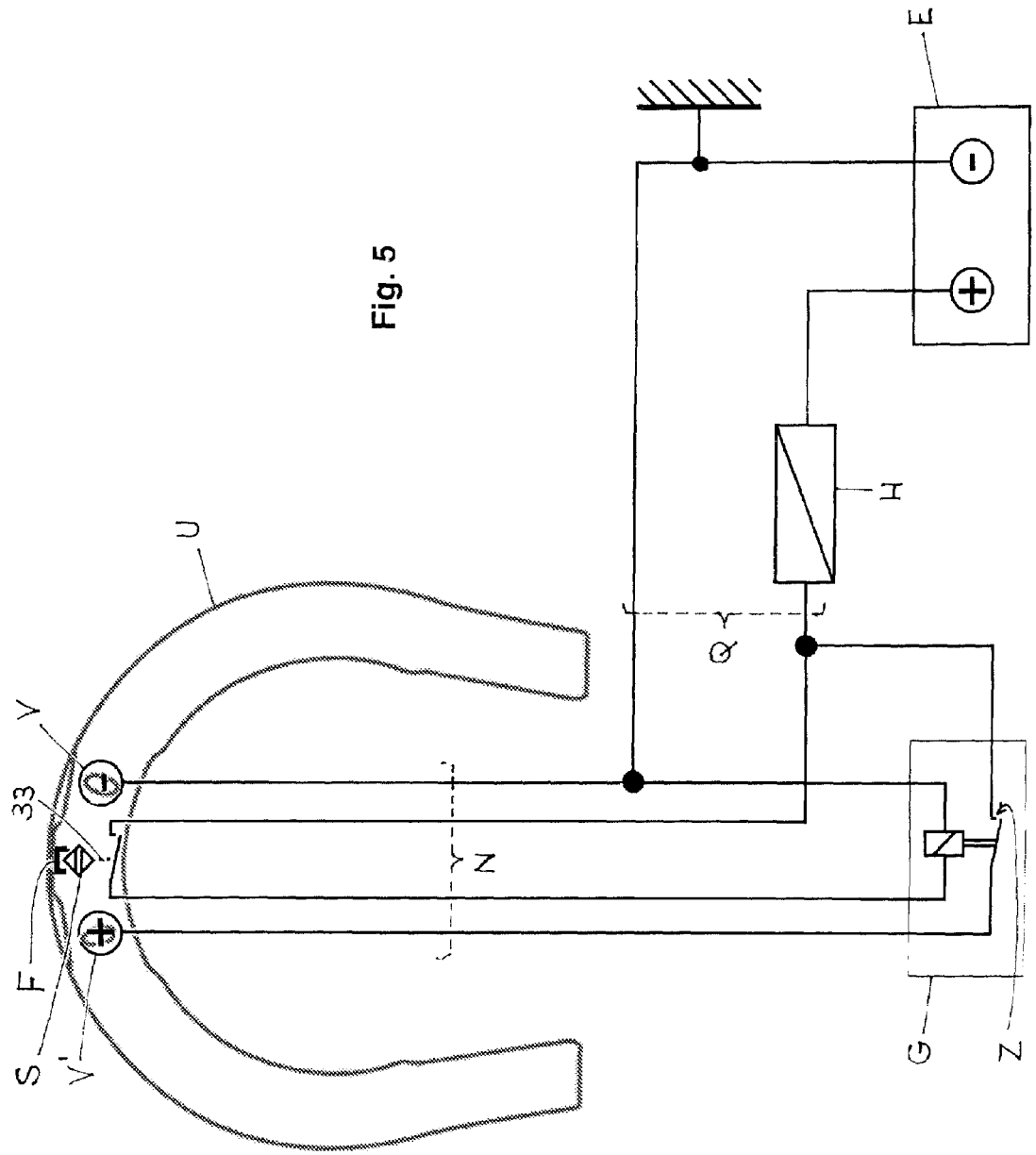

AFFIXATION ADAPTER

CROSS-REFERENCE TO RELATED APPLICATIONS

This application claims the benefit under 35 U.S.C. §119 (e) of U.S. Provisional Application No. 60/774,218 filed Feb. 17, 2006.

The present invention relates to an adapter defined in the preamble of claim 1, in particular to detachably affix an implement to a fuel tank, a bag or the like.

A need arises as regards motor vehicles, in particular motorcycles, to detachably mount on-board certain implements, containers and the like. Zippered pouches or small suitcases have been designed as fuel tank bags illustratively subtending a volume of 10 to 20 liters; however the plurality of different fuel tank shapes and sizes hampers attachment, this attachment however being very important for safety while in traffic. The European patent document EP 1 076 003 B1 discloses a folding, suspended device. Belts, straps, laces are widely used to affix such containers to the fuel tank or the vehicle frame. Where the fuel tanks are made of sheetmetal or plate, magnetic elements are used for attachment and in the design of the German patent document DE 200 20 651 U1 they can be fitted into bottom compartments of the fuel tank bag. Proposals already have been advanced to affix a knapsack or bag in floating manner above the fuel tank.

Improved attachment is disclosed in the German patent document DE 298 23 838 U1 in the form of a plate matching the fuel tank bag, the lower side of said plate being attached to the fuel tank with often cumbersome or elaborate/costly fastening elements such as straps, suction cups or magnets. The adapter plate may be fitted with a recess for the fuel tank pipe stub to allow refueling without need to remove said plate.

The US patent document 2004/031833 A1 discloses a fixture comprising an annular lower segment which is screwed to a flange of a motorcycle fuel tank cap. An upper and also annular portion of said fixture is firmly joined to the bottom for instance of a fuel tank bag and is inserted into the lower annular segment and attached to it by rotation, with inward pointing locking pins of said annular lower segment engaging angled recesses in the upper segment and a detent latch securing the removable attachment. However the relatively narrow path to the tank pipe stub aperture during refueling may be an impediment. The upper segment, when being inserted into the lower segment, of which the dimensions are predetermined by the fuel tank lock, must be comparatively narrow: this requirement may be a drawback where wide luggage is used because the torque load due to a substantial weight might tear the bottom of said luggage.

The German patent document 20 2004 014 057 U1 describes a pertinent adapter for a fuel tank bag of substantially improved design comprising two constituent segments exhibiting an annular or frame-like shape which can be pivotably fitted onto or into each other, one of said segments also being able to span, or be spanned by, the other. In particular said segments are in horseshoe form with mutually aligned ends fitted with paired diametrically opposite segments such as hollow claws in one segment partly enclosing matching elements of the other segment. A spring-loaded catch is used to secure the assembled position, further a receiving borehole is present at or in a bracket opposite the ends of the ring or frame.

The objectives of the present invention are further developments of such adapters at minimal complexity and significant economy. The detachably affixed implement, or the fuel tank bag, also should allow further uses without thereby degrading at all economic manufacture, convenient handling and long-term reliability.

Claim 1 defines the main features of the present invention. Claims 2 through 26 define its embodiment modes.

As regards an adapter comprising two segments which can be reliably joined to and removed from each other, one of said segments is configured at an implement, a fuel tank bag or the like and the other segment is configured or configurable on an annular fuel tank lid, an upper segment mounted on or assemblable to the bottom of the implement, the fuel tank bag or the like, assuming a shape similar to that of the lower segment mount on the said lid, said two segments when joined in the desired position allowing interlocking one with the other in aligned manner, the claim 1 of the present invention provides that one of the said segments (for instance the lower segment), be fitted with a magnetic switch which, when said two segments interlock one another, shall set up a connection to a power supply whereby an electric voltage shall appear across terminals at the other said segment (for instance the upper segment). Said voltage shall power implements, in particular small ones, for instance map lights, cell phone chargers or the like. The adapter of the present invention allows rapidly and reliably locking and unlocking of the implement, the fuel tank bag and the like. Attachment and removal are fast and simple. The firm adapter anchoring to the annular lid does not interfere with refueling because the detachable upper segment can be can be conveniently removed from a refueling path and be locked in place again in problem-free manner anytime.

The power supply is a battery, in particular a motor vehicle battery. Such batteries provide 6 v or 12 v, assuring user safety. Anti-arcing safety is assured in that the magnetic switch—which constitutes one resin-cast or encapsulated unit for electric safety and resistance to vibration and is inserted into and configured in one of said segments—shall indirectly set up electric connection with the terminals in the other of said segments, preferably by means of a cast or encapsulated relay in said segment, said relay moreover optionally being physically separate from these segments.

A detent catch is mounted for instance at or in a bracket connecting the said segments and it consists preferably of a detent element fitted with a spring-loaded detent pin that are present at one of said segments, further of an oppositely configured preferably horizontal receiving borehole in the other of said segments. The magnetic switch is actuated when the pin snaps into said recess and in turn drives the relay to allow picking up the battery voltage across the said terminals. Said voltage may be used for instance for charging or directly operating (small) implements that may be kept in the tank bag. Disengagement may be rapidly and conveniently implemented using a traction element, for instance a string acting on the said detent element even when the fuel tank bag masks the view.

The lower and upper segments may be connected by being mutually assemblable about a pivot axis running parallel to the plane of the lower segment. Both affixation and loosening therefore are carried out by a tipping or pivoting procedure that very much facilitates adapter handling. Accordingly the adapter segments may be designed in a manner that one segment shall span in geometrically locking manner the other segment above or below it, thereby assuring reliable coupling. Preferably a dish- or pan-like articulation shall be used. The upper segment is not mandatorily in the shape of a ring or a frame; it need only comprise detent means for the lower segment, namely hooks. If the frame or annular shape is interrupted in one circumferential arc of one or both segments, an open ring or horseshoe shape is attained, whereby the free frame-like or ring ends—preferably fitted with paired, diametrically opposite segments—are mutually aligned. Alternatively the upper segment is fitted a bridging element connecting its ends and assuring high dimensional stability.

The frame-like or annular ends of one segment appropriately are claws and those of the other segment are claw counterparts, each counterpart optionally being a positive, or solid element that may be at least partly enclosed or locked by a claw in the form of a negative or hollow element.

Convenient handling is enhanced by gripping ribs fitted on at least the annular or frame-like ends of the upper segment. This upper segment may be fitted at its underside with stop ribs which in the assembled position rest on or in a top surface of the lower segment.

In one embodiment allowing advantageous manufacture and wherein the said segments subtend a clear inner space, similar aperture bounding elements of the upper and lower segments are associated with similar aperture bounding elements of an annular lid mounted on the lower segment. The lower segment appropriately may be affixed to the annular lid by means of latter's screws.

The said segments offer long service life in particular by being cross-sectionally shaped structures such as channels, bars and the like fitted with bracing ribs.

In one advantageous embodiment of the present invention, the upper segment is matched by its top side to the shape and size of an implement to be affixed, for instance a digital or video camera, a navigation implement or the like. Said upper segment may also be fitted with a vibration-damped cover whereby said implement optionally shall be connected in vibration-free manner to the adapter. A low voltage implement may be mounted on the said cover in a manner that upon engaging the detent catch it shall be immediately operative.

Said cover may bear an implement coupling element. Appropriately a disk, plate or the like is affixed to the top side of said cover by laterally projecting damping elements, for instance so-called rubberized anti-vibration metal pads. Advantageously said cover shall be supported in vibration-free manner on the arms of a disk, plate or the like detachably or rigidly connected with it, said disk, plate or the like being spanned if desired without touching a cover plate element illustratively fitted with insulating bearings on angle bars.

Further features, details and advantages of the present invention are defined by the appended claims and also are discussed below in relation to the appended drawings.

FIG. 5 shows an electric circuit for the unit of FIG. 4,

Figure 1:
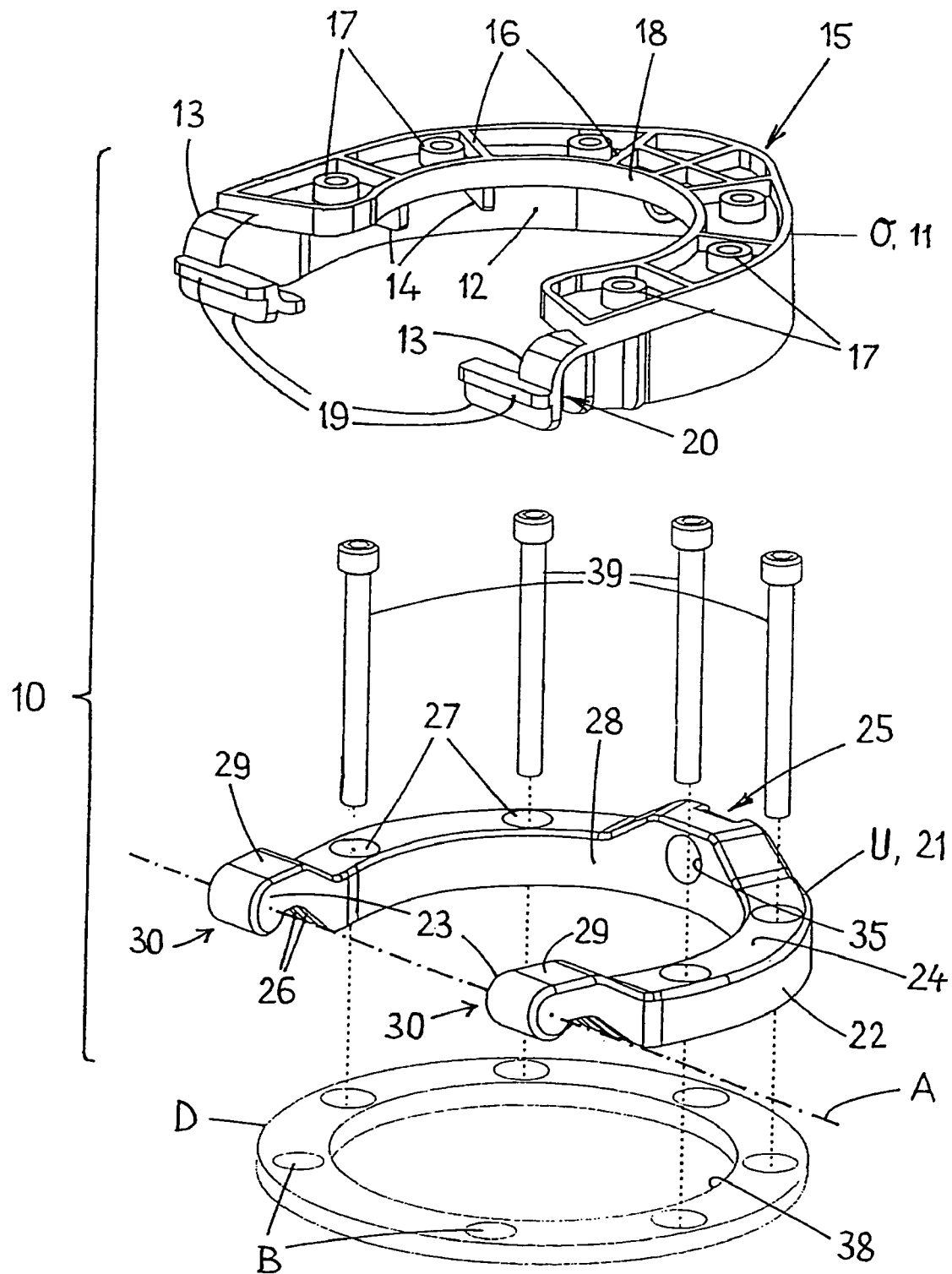
FIG. 1 is an exploded oblique view of an adapter.
Figure 2A:
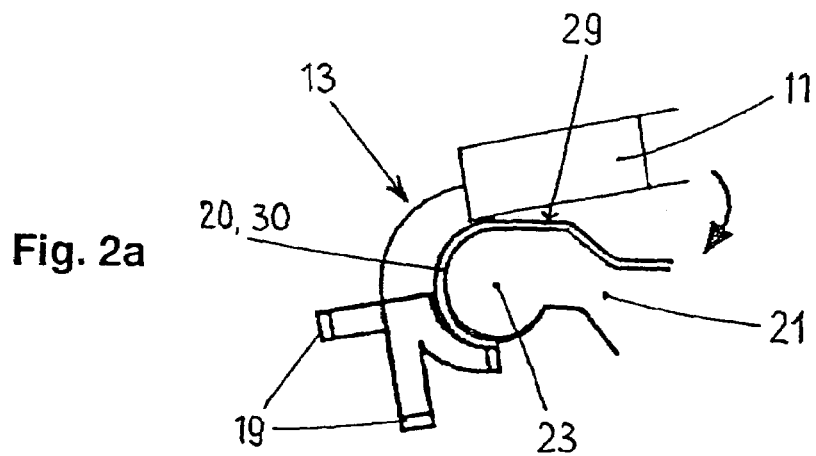
FIG. 2a is a schematic partial view of detent catches before being engaged.
Figure 2B:
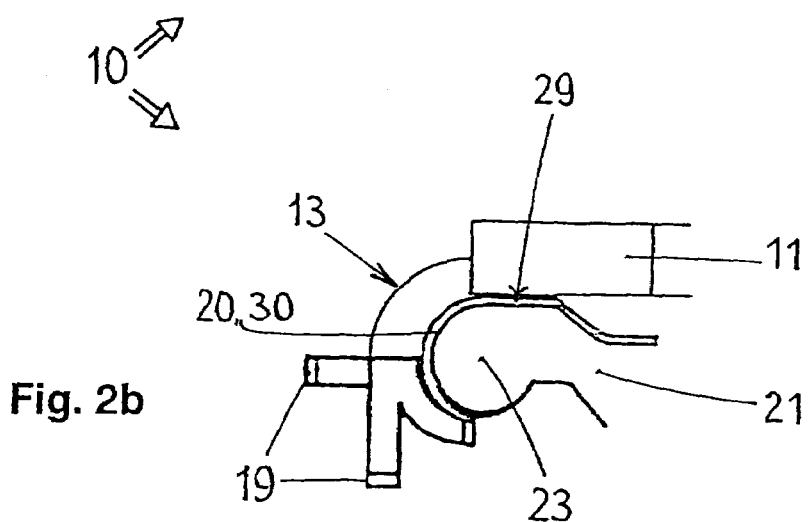
FIG. 2b is a schematic partial view of detent catches after being engages.

An adapter is denoted overall by 10 in FIG. 1 and consists therein of two segments, namely an upper segment O and a lower segment U. In the embodiment being shown, both segments are open circular structures similar to horseshoes which are easily mutually assembled and disassembled, the upper segment O comprising free ends in the form of claws 13 and the lower segment U comprising free ends in the form claw counterparts 23 which can be assembled to each other to form an articulation (FIGS. 2a, 2b).

Preferably both segments O, U exhibit defined cross-sections and are made of plastic. The upper segment O is fitted at the center of its arcuate part 11 with a cog 15 and the lower segment U is fitted at the center of its arcuate part 21 with a similar cog 25. The cross-sectionally contoured structure is fitted at its upper segment O with bracing ribs 16 and perforated cams 17 that are distributed circumferentially in the same manner as the boreholes 27 at the lower segment U. Both segments exhibit the same clearance boundaries 18 respectively 28. An annular lid D is situated at an omitted fuel tank cap for instance of a motorcycle, its boreholes B being aligned with the lower segment boreholes 27 and the upper segment cams 17. Screws 39 pass through the boreholes 27 of the lower segment U to affix the cover ring D to the fuel tank. A clearance limit 38 at the cover ring D corresponding to the clearance limits 18, 28 allows passing through the fuel tank lock or pipe stub.

The upper segment O can be attached to an omitted fuel tank bag using screws or rivets passing through the cams 17. Alternatively said upper segment's top side is designed to constitute a spatially matching support for instance for a digital or video camera, a navigation implement or the like that may be connected to a vibration-insulated cover C mounted on the upper segment O, preferably by means of a coupling element K (FIGS. 6, 7) present at said upper segment.

The two segments O, U are coupled to each other by placing the claw-shaped ends 13 of the upper segment O which is held slightly obliquely, that is at an angle, to the claw counterparts 23 of the lower segment U (FIG. 2a), whereupon the upper segment O, together with the fuel tank bag, shall be pivoted downward about the axis A (FIG. 1) and the two segments O, U are detachably secured by means of a detent catch S, i.e. a detent element 31. When the upper segment O is pivoted downward, stop ribs 14, that may be configured at the lower side of the cross-sectionally contoured structure, come to rest against the top surface 24 of the lower segment U. This condition is shown in FIG. 2b. At the same time the lower side of the free ends 13 comes to rest against the stop surfaces 29 of the counterparts 23 which are braced internally, i.e. at the bottom, by ribs 26 (FIG. 1).

Preferably the segments O, U are dimensioned in a manner that the upper segment O spans by its inner wall 12 the lower segment U at latter's outer wall. To facilitate handling, the upper segment O is fitted at its free ends 13 with gripping ribs 19 allowing placing the upper segment O on the lower segment U in easy manner, thereby subtending a conceptual, central pivot axis.

Figure 3:
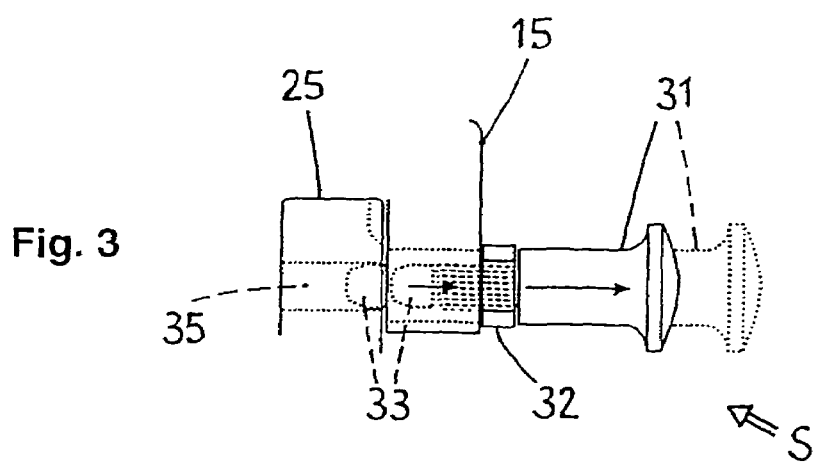
FIG. 3 is a partial view of a detent catch.

FIG. 3 shows that the coupled state can be easily secured using the detent catch S. The design of the detent element may deviate from that shown in FIG. 3, for instance an uncoupling string being fitted to said detent element. The step 25 of the lower segment U is fitted with a catch borehole 35 that may be engaged by the force of an omitted spring acting on a detent pin 33 of the detent element 31, said pin being affixed to the cog 15 of the upper segment O by means of support ring 32. FIG. 3 shows the engaged position (left) and, in dashed or dotted lines, the displacement in the direction of the arrow against the spring force to release the detent element 31.

Figure 4:
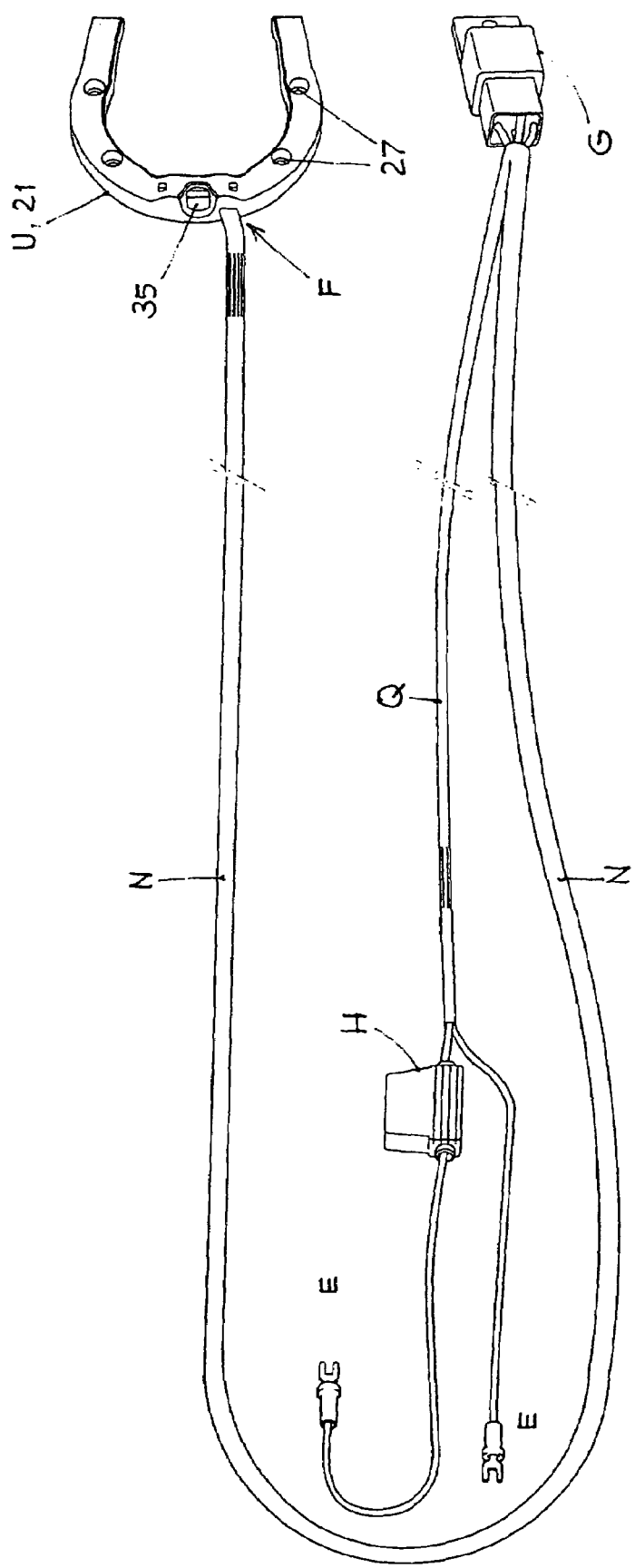
FIG. 4 is an oblique topview of a lower adapter segment with cable hookups.

FIG. 4 shows a preferred embodiment mode of the invention. A magnetic switch F is configured in the cross-sectionally contoured structure 21 of the shown lower segment U near the catch borehole 35 and is connected by a four-wire cable N to a relay G. A two-wire cable Q runs from said relay to a voltage source E (omitted from FIG. 4); one of the wires of the cable Q is fitted with a molded housing and used as an exchangeable fuse.

FIG. 5 shows the associated electric switching circuitry. Preferably the power supply/voltage source E is a 6 v or a 12 v motor vehicle battery and is connected at its negative terminal directly by a grounded conductor to the terminal V at or in the lower segment U. The positive battery terminal is connected through a circuit-breaking element H to the magnetic switch F and through the relay G to a second terminal V'. When the pin 23 enters the detent catch S, the magnetic switch will be actuated and as a result the relay circuit then is closed and the relay will respond, whereby the battery voltage will then be applied through the presently contacting relay points to the second terminal V'.

Figure 7:
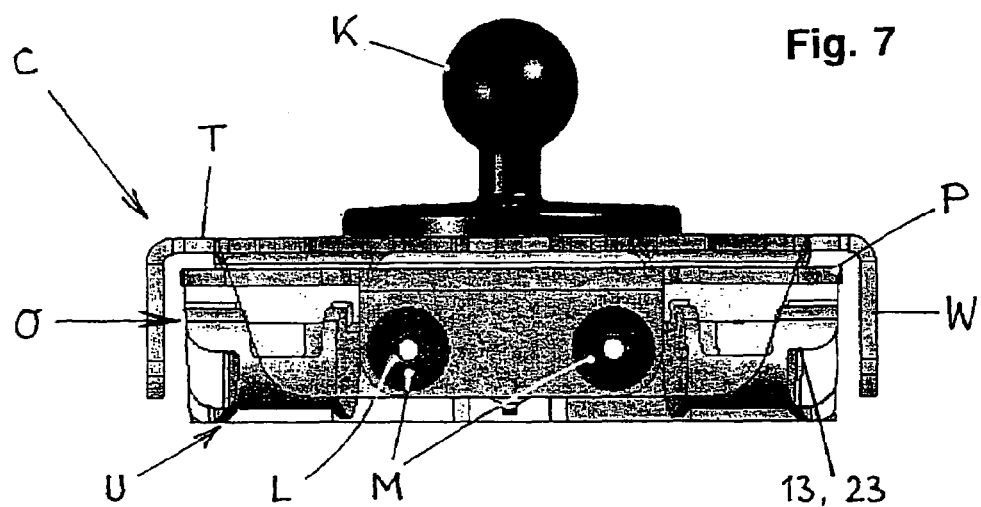
FIG. 7 is front elevation of the adapter of FIG. 5 fitted with a cover.
Figure 6:
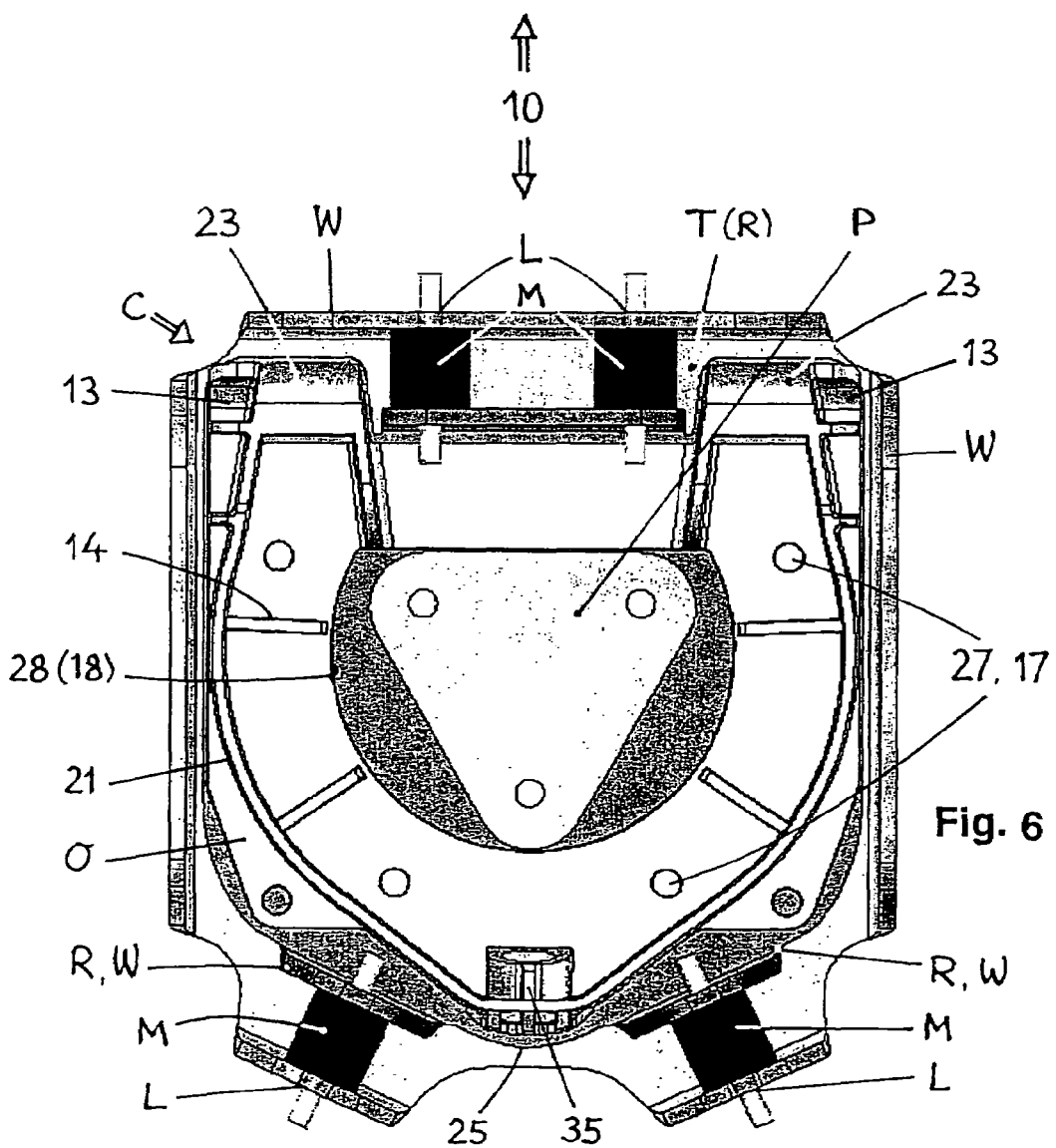
FIG. 6 is a bottom view of a vibration-damped adapter.

As shown by FIGS. 6 and 7, the adapter 10 is able to keep in place a vibration-damped cover which is fitted with a coupling element K for an implement, a fuel tank bag or the like. For that purpose a disk, a plate P or the like may be mounted to the upper segment O and be fitted with laterally projecting damping elements bearing the cover C. In a very advantageous design, the cover C rests in vibration-free manner on arms R of the disk, plate or the like connected in detachable or undetachable manner to the upper segment O. Preferably said arms R are fitted with bearings L holding insulating elements M resting against or in angle bars W of laterally projecting parts of a cover plate element T that spans the disk, the plate P or the like without making contact with it.

The invention is not restricted to the above discussed embodiment modes and applications, but instead it may be modified in many ways. Illustratively the upper segment O may—unlike the case shown in FIG. 1—comprise a bridge element integrally joining together the ends 13 and in this manner substantially increasing dimensional stability without thereby degrading handling. Moreover the said adapter may be used to support and brace a digital or video camera or a similar implement where the upper segment O—similarly to the case illustrated in FIG. 7—at its top supports the particular implement and/or matches its shape and size—whereas said lower segment, further the affixation to the annular lid D and the handling remain unchanged. The apparatus also can be supplied with power when a vibration-damped cover is used. Again implements such as a mobile phone may be stored in the fuel tank bag and be recharged while therein.

Significantly the adapter 10 of the invention merely requires two mutually coupling, frame-like or annular segments O, U which can be interlocked in geometrically and dimensionally stable manner to each other to be pivotably connected in particular about a horizontal axis A while offering the arc-free disconnection of a low voltage source. Where necessary, however said two segments may be disconnected quickly. They may be assembled/disassembled in pivotable and detachable manner and be secured in their assembled state. An upper segment O configured at the base of the fuel tank bag assumes a shape similar to a lower segment U to which it can be engaged and which furthermore is mounted on an annular lid. Preferably the segments O, U of the fuel tank adapter 10 are fitted with free, aligned ends 13, 23 at cross-sectionally contoured elements 11, 21, one of said segments being able to geometrically interlock with the other from above or below. In case the circumferential or frame-like shape of the segments O, U are interrupted, said segments assume a horseshoe shape comprising paired diametrically opposite portions 20, 30 fitting onto or into each other. The upper segment O need not be annular; it is enough that it be fitted with means engaging the lower segment U, namely catch hooks. Advantageously the free ends 13 of one of the segments (for instance O) are claws in the form of negative or hollow elements that partly enclose positive or solid elements acting as claws counterparts 23 of the other segment (for instance U). At least the ends 13 of the upper segment O may be fitted with gripping ribs 19. The assembled adapter 10 secures a detent catch S which is configured at or in a connecting bracket opposite the ends 13, 23 and which consists of a receiving/catch borehole 35 and a spring-loaded detent element 31. When entering the borehole 35, said detent element 31 illustratively by means of a detent pin 33 actuates a magnetic switch F, as a result of which a low voltage is applied via a relay G to terminals V, V'. The above detent catch S is released for instance merely by pulling the detent element 31 against its biasing spring to disengage the segments O, U and to effortlessly remove the fuel tank bag. The upper segment O may be fitted at its underside with stop ribs 14 which, in the assembled configuration of said two segments O, U, are seated on or in a top surface 24 of the lower segment U. A cover C mounted for instance in vibration-damped manner on at least three arms R of the upper segment O may comprise an implement coupling element K.

All features and advantages arising from the claims, the description and the drawing, inclusive design details and spatial configurations, may be construed being inventive per se as well as in arbitrary combinations.

LIST OF REFERENCE SYMBOLS

| A | pivot axis | 10 | adapter |
|---|---|---|---|
| B | boreholes | 11 | (cross-sectionally contoured} peripheral part |
| C | cover | | |
| D | annular lid | 12 | inside wall |
| E | power supply/battery | 13 | free ends/claws |
| F | magnetic switch | 14 | stop ribs |
| G | relay | 15 | cog |
| H | fuse | 16 | (bracing) ribs |
| K | coupling element | 17 | cams |
| L | bearing | 18 | aperture bounding element |
| M | insulating elements/ rubber-metal joints | 19 | gripping ribs |
| | | 20 | grip space |
| N | (four-conductor) cable | 21 | cross-sectionally contoured peripheral part |
| O | upper segment | | |
| P | plate/disk | 22 | outer wall |
| Q | (double conductor) cable | 23 | free ends/claw counterparts |
| R | (radial) arms | 24 | (stop) top surface |
| S | detent catch | 25 | cog |
| T | cover plate element | 26 | (bracing) ribs |
| U | lower segment | 27 | boreholes |
| V | terminals | 28 | aperture bounding element |
| W | angle bars | 29 | stop surfaces |
| Z | relay contacts | 30 | bearing beaks |
| | | 31 | detent element |
| | | 32 | support ring |
| | | 33 | snap-in/detent pin |
| | | 35 | catch borehole |
| | | 38 | aperture bounding element |
| | | 39 | screws |
| | | 40 | |

The invention claimed is:

1. An adapter (10) comprising two detachable segments (O, U) which shall be connected in interlocking manner to one another, one of said segments (O) being attachable or attached to an implement, to a fuel tank bag or the like and the other segment (U) being attachable or attached to a fuel tank annular lid (D), where an upper segment (O) attachable to or present on the base of the implement kit, the fuel tank bag or the like is similar in shape to the lower segment mounted to the annular lid (D), the two segments (O, U) when assembled being aligned to be interlocked into each other, characterized that one of the said segments, for instance segment (U)

receives a magnetic switch (F) which, upon interlocking the segments (O, U), shall turn ON the power supply (E) whereby a voltage shall be applied to the terminals (V) in the other segment (for instance O).

2. Adapter as claimed in claim 1, characterized in that the electric power supply (E) is a rechargeable battery or a battery, in particular a motor vehicle (rechargeable) battery illustratively of the 6 v or 12 v type.

3. Adapter as claimed in either of claims 1, characterized in that the magnetic switch (F) is designed as an encapsulated or resin-cast unit which can be plugged into or be mounted in the lower segment (U).

4. Adapter as claimed in claim 3, characterized in that the magnetic switch (F) indirectly sets up the electric connection to the terminals in the upper segment (O), namely by means of a magnetically coupled unit (G) configured spaced apart from the said segments (O, U).

5. Adapter as claimed in claim 4, characterized in that the magnetically coupled unit (G) is an encapsulated or cast relay.

6. Adapter as claimed in claim 1, characterized in that a detent catch (S) is used to actuate the magnetic switch (F) and is configured for instance at or in a connection strip of the segments (O, U).

7. Adapter as claimed in claim 1, characterized in that spring-loaded electric terminals are fitted onto at least one (O) of the said segments.

8. Adapter as claimed in claim 6, characterized in that the detent catch (S) is fitted with a spring-loaded detent element (31) mounted at one (O) of the said segments and comprising a detent pin (33) and with a preferably horizontal receiving borehole (35) opposite to and receiving said pin.

9. Adapter as claimed in claim 1, characterized in that both segments (O, U) are designed to assume a frame-like or annular shape in a manner that one segment (for instance O) spans the other (for instance U) from above or below in geometrically interlocking manner.

10. Adapter as claimed in claim 9, characterized in that the annular of frame-like shape of at least one segment (O, U) is interrupted in a peripheral zone, in particular between the ends (13, 23) in a manner that optionally one or both segments (O, U) assumes an annularly open or horseshoe shape.

11. Adapter as claimed in claim 10, characterized in that the upper segment (O) comprises a yoking portion connecting its ends (13).

12. Adapter as claimed in claim 10, characterized in that the annular or the frame-like ends (13, 23) of the segments (O, U) comprise paired diametrically opposite portions (20, 30).

13. Adapter as claimed claim 10, characterized the frame-like or annular ends (13) of one of the said segments (for instance O) are claws and those (23) of the other segment (for instance U) are claw counterparts.

14. Adapter as claimed in claim 13, characterized in that each counterpart (23) is positive, i.e. a solid element which is enclosed or enclosable at least in part by a claw (13) by a claw (13) in the form of a negative, i.e. a hollow element.

15. Adapter as claimed in claim 10, characterized in that at least the frame-like or annular ends (13) of the upper segment (O) are fitted with gripping ribs (19).

16. Adapter as claimed in claim 1, characterized in that the upper segment (O) is fitted at its underside with stop ribs (14) which, in the assembled state of the segments (O, U) are seated on or in a top surface (24) of the lower segment (U).

17. Adapter as claimed in claim 1, characterized in that the segments (O, U) subtend and enclose a clear inner space by similarly shaped aperture bounding elements (18, 28) of the upper and lower segments (O, U) being associated to a dimensionally similar aperture bounding element (38) of an annular lid (D) affixed to the lower segment (U).

18. Adapter as claimed in claim 17, characterized in that the lower segment (U) is affixed by the screws (39) of the annular lid (D) to this lid.

19. Adapter as claimed in claim 8, characterized in that a string, a cord or the like is connected to the detent element (31) and allows releasing said element against the spring force applied to it.

20. Adapter as claimed in claim 8, characterized in that the segments (O, U) are cross-sectionally contoured structures (11, 21) made of plastic and in particular are fitted with bracing ribs (16, 26).

21. Adapter as claimed in claim 1, characterized in that the upper segment (O) is matched at its top side to the shape and size of an implement to be held in position such as a digital or video camera, a global positioning system or the like.

22. Adapter as claimed in claim 1, characterized in that the upper segment (O) affixes a cover (C) in vibration-damping manner.

23. Adapter as claimed claim 21, characterized in that the cover (C) bears a coupling (K) for an implement, a fuel tank bag or the like.

24. Adapter as claimed in claim 21, characterized a disk, a plate (P) or the like is affixed to the upper segment (O) and is fitted with laterally projecting insulating elements (M) for the cover (C).

25. Adapter as claimed in claim 22, characterized in that the cover (C) rests in vibration-damped manner on the arms R of a disk, a plate (P) or the like in detachable or rigidly connected manner to the upper segment (O).

26. Adapter as claimed in claim 24, characterized in that the disk, the plate (P) or the like is spanned by a cover plate element (T) without touching it, said plate element (T) illustratively being fitted with bearings (L) for the damping elements (M) on angle strips (W).

* * * * *